March 4, 1930.                    R. BERINGER                    1,749,311
                                   PIVOT JOINT
                               Filed June 30, 1927

Inventor
Roscoe Beringer
By Blackmore, Spencer & Hill
Attorneys

Patented Mar. 4, 1930

1,749,311

UNITED STATES PATENT OFFICE

ROSCOE BERINGER, OF DETROIT, MICHIGAN, ASSIGNOR TO GENERAL MOTORS CORPORATION, OF DETROIT, MICHIGAN, A CORPORATION OF DELAWARE

PIVOT JOINT

Application filed June 30, 1927. Serial No. 202,658.

This invention relates to pivot joints and particularly to a novel and improved construction for mounting a vehicle chassis frame upon a load supporting spring.

An object of the invention is to provide a simple device which will be economical to manufacture and install, efficient in use and unlikely to get out of repair.

A further object of the invention is to provide a flexible non-metallic connection between the parts, for the purpose of eliminating frictional metallic contact and obviating the customary problems of lubrication and necessity for frequent care and attention, and which also serves as a cushion for reducing the effects of road shocks and vibrations.

Figure 1:
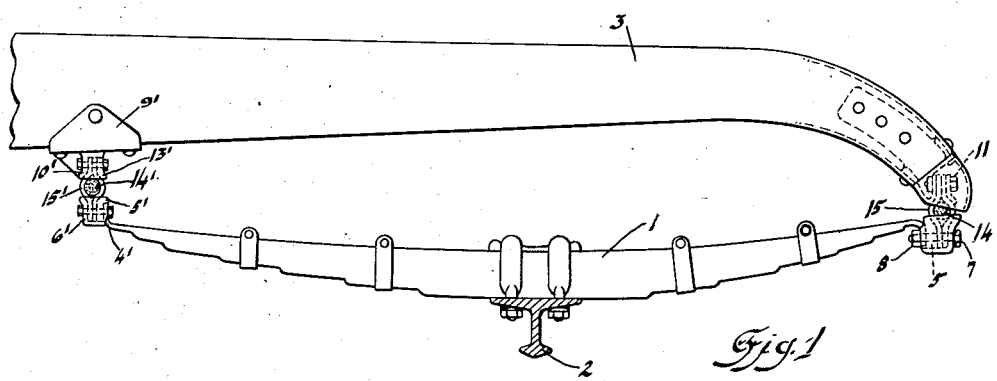
Figures 2, 3:
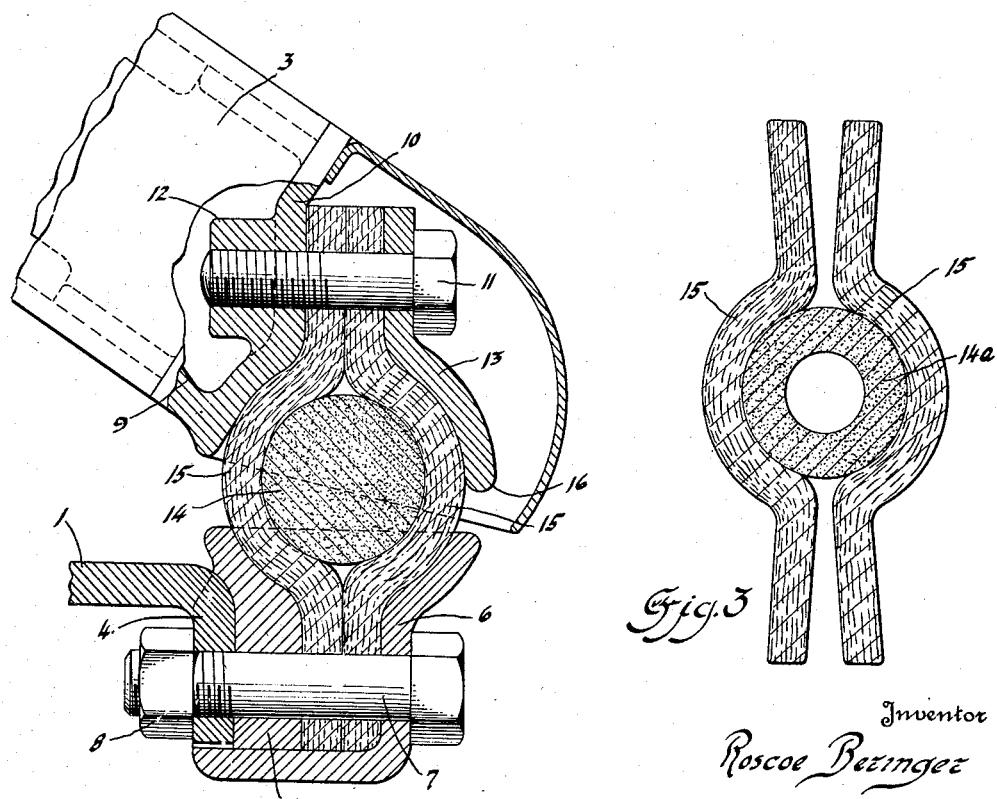

Other incidental objects and features of advantage will be apparent from the following specification, taken in connection with the accompanying drawing illustrating a preferred embodiment of the invention, and wherein Figure 1 is a side elevation of a vehicle spring, supporting the front portion of a chassis frame upon the axle, and employing the mounting forming the subject matter hereof; Figure 2 is a vertical sectional view of the mounting, and Figure 3 is a side elevation of portions of the joint before assembly, one of the parts being shown in slightly modified form.

Referring more particularly to the drawing, the reference character 1 indicates a semi-elliptical multi-leaf spring mounted at a central point on the road axle 2, and connected at opposite ends with the chassis frame sill 3, to flexibly support the load on the axle. The connections between the two spring ends and the chassis frame member with which the present invention is concerned are substantially the same in each instance.

In the case of the front end or drive connection, the extremity of the uppermost or long leaf of the spring 1, is bent or turned down as at 4, and carries clamping members or plates 5 and 6, secured thereto by a bolt 7 having the nut 8 screw threaded thereon. Similar clamping members are provided on the end of the down turned horn of the chassis frame member or longitudinal sill 3. In this case, the frame member 3 is of channelled shape in cross section. The bracket 9 is bolted or riveted within the channel and is provided with an end wall 10, which forms one of the clamping surfaces. A bolt 11 having screw threaded engagement within a lug or enlargement 12 at the rear of the wall 10, moves the clamping plate 13 to and from the clamping surface provided by the wall. Each set of clamping surfaces associated respectively with the frame and spring, have flared or outwardly curved mouth portions which afford oppositely disposed cavities in which is located an elongated cylindrical roll or core 14, of rubber or other similar non-compressible elastic material held between a pair of flexible but inextensible or non-stretchable straps 15—15, of suitable material such as fabric, preferably rubber impregnated. Medial portions of the straps are preferably integrally secured to portions of the periphery of the rubber core or block 14, as by vulcanization or the like. Before assembly, as shown in Figure 3, these straps do not completely envelop the core, but a small space is left between the end portions of the straps. Upon installation, the bolts 7 and 11 extend through and draw the opposite end portions of the straps together, between the clamping surfaces on the spring and frame respectively, and serve to place the rubber core 14 under initial pressure. The degree of initial pressure will be governed by the character and the elasticity of the core as well as the load to be supported, so as to insure a stable and firm joint but one which will still have a sufficient amount of yield for the purposes hereof. In some instances, the material of the core will be such as to make it desirable to employ a core having portions cut away, or a hollow core as shown at $14^a$ in Figure 3, in order to increase responsiveness to deformation. In use, relative movement of the axle and frame deflects the vehicle spring and the joint allows both a slightly longitudinal movement and an axial movement of the spring end with respect to the frame sill, through flexure of the straps and deformation of the core. In order to obviate rough or sharp edges and the danger of cutting or weakening the threads of the fabric straps, the flared mouth portions of the clamping surfaces have their edges rounded or curved as at 16.

At the rear end of the spring the angle bracket 9' is bolted or riveted to the outside of the frame member 3 and is provided with a dependent portion 10' affording a surface against which the plate 13' clamps at upper ends of the straps 15'. The lower ends of the straps are held between clamping members 5' and 6' carried on the upturned extremity 4' of the uppermost leaf of the spring 1. In order that this rear shackle may have more freedom of movement than is permitted at the front or drive connection, to accommodate to a greater degree longitudinal extension of the spring upon deflection the clamping members for the upper and lower ends of the straps do not approach each other to the same extent as those at the front end of the spring, with the result that the confinement of the medial portions of the strip, surrounding the core 14', is materially reduced.

While the device has been described in terms more or less specific, it is to be understood that the invention is not limited to exact details shown, but that such modifications may be made as come within the scope of the appended claims.

Having described my invention, I claim:

1. A compression joint for supporting the weight of one part to be joined upon another including a pair of flexible but inelastic straps secured at opposite ends to parts to be joined, and an elastic block held under compression between the intermediate portions of the straps and yieldable to permit flexing of the straps upon relative movement of the parts.

2. A compression joint for supporting the weight of one part to be joined upon another including plies of flexible but inextensible fabric material, a hollow cylindrical block of non-compressible deformable material interposed between said plies intermediate the ends thereof and adapted to be placed under compression by the weight of the supported part, the opposite ends of said plies being adapted for attachment with relatively movable parts.

3. A compression joint for supporting the weight of one part to be joined upon another including a pair of flexible but inextensible straps, means for clamping opposite ends of the straps to each other and in engagement with two parts to be joined, said means having oppositely disposed flared mouth portions, a cylindrical roll of elastic material separating intermediate portions of the straps within said flared mouth portions and deformable therebetween to permit relative movement of the parts, and held under compression by the weight of the supported part.

4. A compression joint for supporting the weight of one part to be joined upon another including a pair of flexible but inextensible straps, means for clamping opposite ends of the straps to each other and in engagement with two parts to be joined, said means having oppositely disposed flared mouth portions, a cylindrical roll of elastic material separating intermediate portions of the straps within said flared mouth portions and deformable therebetween to permit relative movement of the parts, said elastic material being placed under initial tension upon the clamping of the straps to each other and being placed under compression by the weight of the supported part.

5. A compression joint for supporting the weight of one part to be joined upon another including a pair of flexible but inextensible straps, means for clamping opposite ends of the straps to each other and in engagement with two parts to be joined, said means having oppositely disposed flared mouth portions, a cylindrical roll of elastic material adapted to be placed under compression by the weight of the supported part separating intermediate portions of the straps within said flared mouth portions and deformable therebetween to permit relative movement of the parts, said roll having an opening therein to facilitate deformation.

6. A compression joint for supporting the weight of one part to be joined upon another including a pair of flexible but inextensible straps, clamping means engaging the ends of the straps for connecting the straps to parts to be joined leaving central portions of the straps unconfined, and a cylindrical elastic member interposed between said central portions, deformable with strap flexure upon relative movement of the parts, and being held under compression by the weight of the supported part.

7. In a spring shackle construction, the combination with a vehicle frame and a load supporting spring, of a compression joint between the frame and one end of the spring for carrying the weight of the frame upon the spring, including clamping elements associated with the frame and spring end respectively and provided with oppositely disposed concavities, flexible but inextensible straps having portions held by the clamping elements and a body of elastic material located between said straps and within said concavities, for supporting the weight of the supported frame, and deformable to permit relative movement between the spring end and frame.

8. In a spring shackle construction, the combination with two vehicle parts to be joined, one of which is an axle spring, each being provided with a concavity disposed opposite each other, of a block of non-compressible deformable material located within said concavities to support the weight of one part on the other and deformable to allow relative movement of the parts, and a pair of flexible straps having portions adjacent their opposite ends in contact with and secured to the respective parts to be joined, and having portions intermediate said end portions separated from each other and passing about the periphery of said block.

9. In a spring-shackle construction, the combination with vehicle parts to be connected, one of which is an axle spring, of a compression joint between said parts held under compression by the weight of the supported part, and including a rubber core and facings of fibrous material embracing said core and held bulged apart thereby between said parts, anchorages securing said strap to the said parts, and a cheek-element on one of said anchorages adapted to be contacted by the bulged portion of the strap to prevent excessively localized flexure of the latter as an incident of the spring action.

10. In a spring-shackle construction, the combination with vehicle parts to be connected, one of which is an axle spring, of a compression joint connecting said parts to yieldingly support the weight of one on the other, said joint comprising facings of rubberized fibrous material and a cushion body of rubber embraced by, vulcanized to and holding bulged apart the said facings, said rubber body being held under compression by reason of the weight of the supported part.

In testimony whereof I affix my signature.

ROSCOE BERINGER.